United States Patent [19]

Nagao et al.

[11] Patent Number: 5,181,258
[45] Date of Patent: Jan. 19, 1993

[54] LINEAR PATTERN RECOGNIZING METHOD

[75] Inventors: Makoto Nagao; Keiji Terada, both of Hiratsuka, Japan

[73] Assignee: Kabushki Kaisha Komatsu Seisakusho, Japan

[21] Appl. No.: 465,232

[22] Filed: Mar. 14, 1990

[30] Foreign Application Priority Data

Oct. 2, 1987 [WO] World Int. Prop. O. .......... PCT/JP87/00735

[51] Int. Cl.$^5$ ............................................. G06K 9/36
[52] U.S. Cl. ....................................... 382/28; 382/46; 382/53; 358/107
[58] Field of Search ...................... 382/1, 8, 44, 45, 46, 382/48, 50, 51, 24, 29, 28, 53; 358/106, 107

[56] References Cited

U.S. PATENT DOCUMENTS

| | | | |
|---|---|---|---|
| 4,922,543 | 5/1990 | Ahlbom et al. | 382/46 |
| 4,953,230 | 8/1990 | Kurose | 382/46 |
| 5,046,109 | 9/1991 | Fujimori et al. | 382/8 |

FOREIGN PATENT DOCUMENTS 0206713 12/1986 European Pat. Off. .

OTHER PUBLICATIONS

*Systems & Computers in Japan*, vol. 17, No. 5, May, 1986, pp. 8-15.
*Systems & Computers in Japan*, vol. 17, No. 5, May 1986, pp. 54-63.

Primary Examiner—Michael T. Razavi
Assistant Examiner—Yon Tung
Attorney, Agent, or Firm—Welsh & Katz, Ltd.

[57] ABSTRACT

Disclosed is a linear pattern recognizing method of recognizing a linear pattern included in the image data stored in an original image memory. The memory region of the original image memory is divided into a plurality of smaller regions, and the image data of the smaller regions are utilized to obtain projection waveforms at a plurality of projection angles for each smaller region. The projection waveforms thus obtained are analyzed to detect the presence or absence, line direction ($\theta$), smaller region. According to the results of detection, a linear segment corresponding to the linear pattern is extracted for each smaller region.

24 Claims, 12 Drawing Sheets

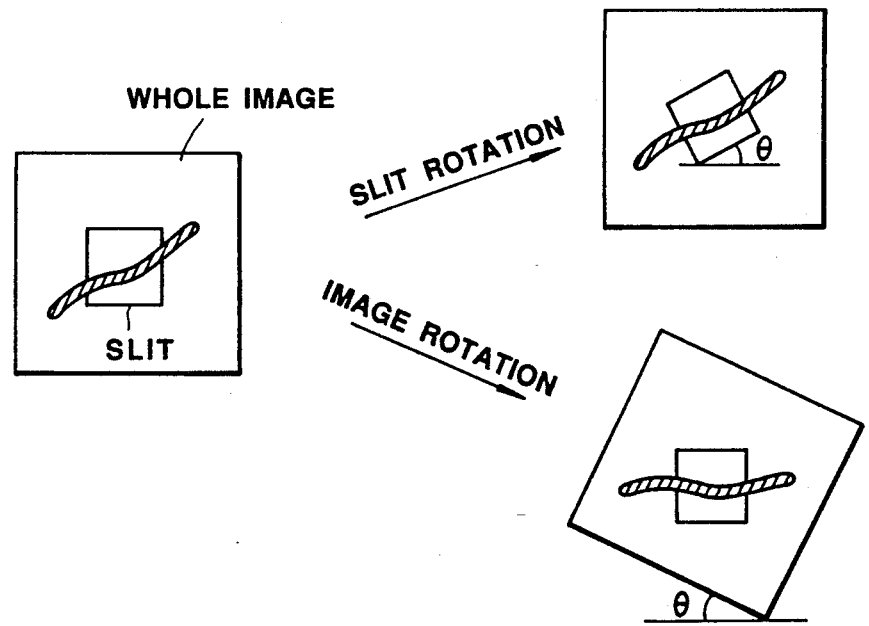
FIG. 2
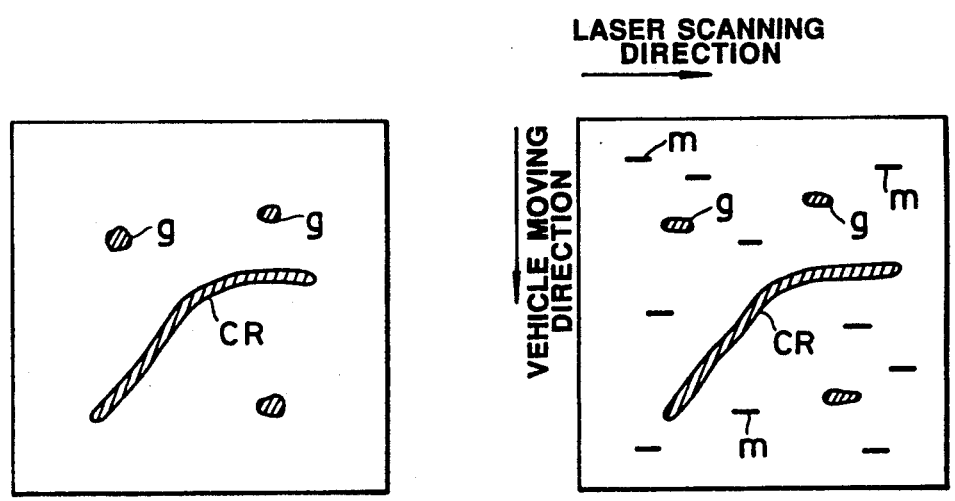
FIG. 3(a)  FIG. 3(b)

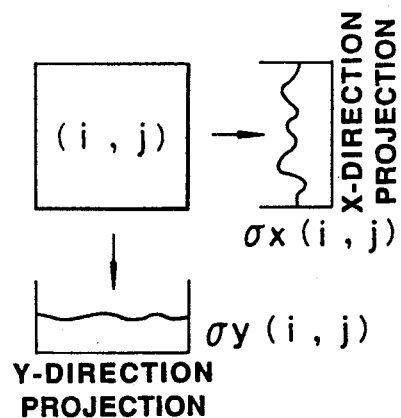
FIG. 4(a)
FIG. 4(b)
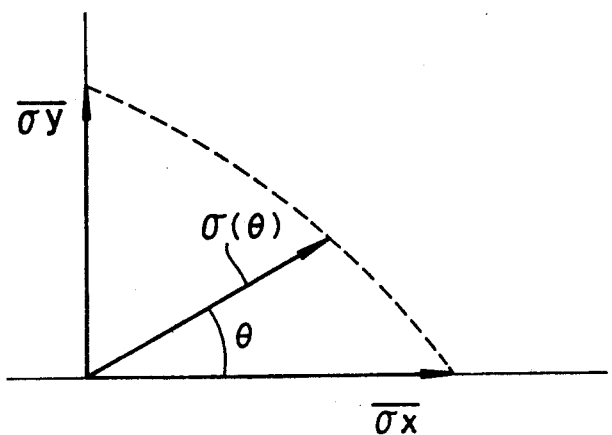
FIG. 4(c)

ORIGINAL WAVEFORM

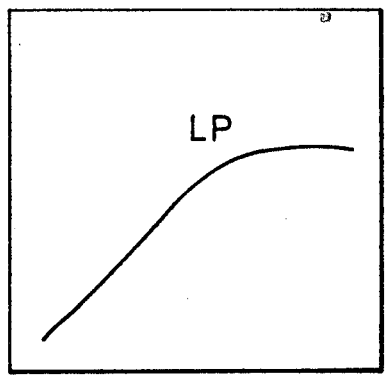
FIG.6(a)
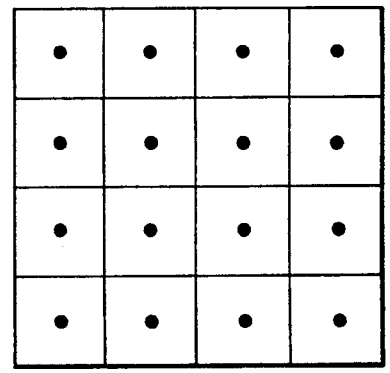
FIG.6(b)
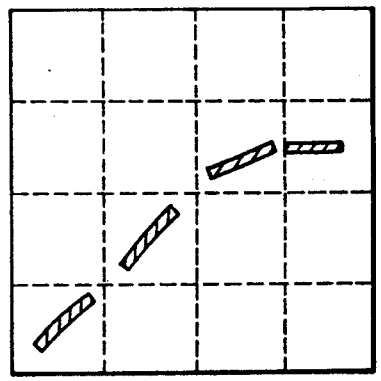
FIG.6(c)
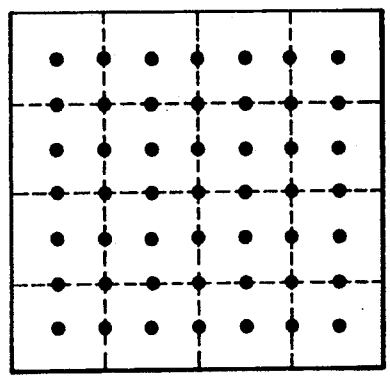
FIG.6(d)
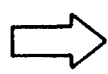
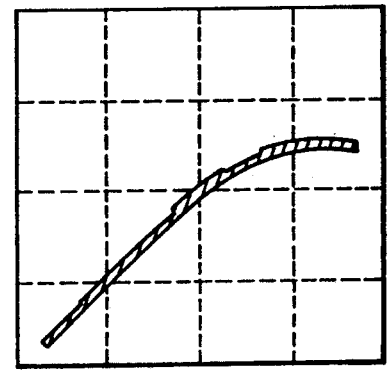
FIG.6(e)

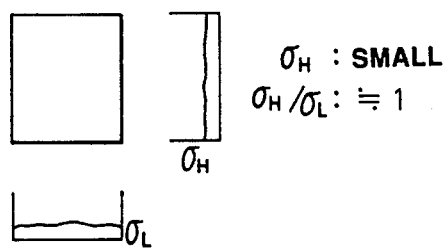
FIG. 9(a) BACKGROUND
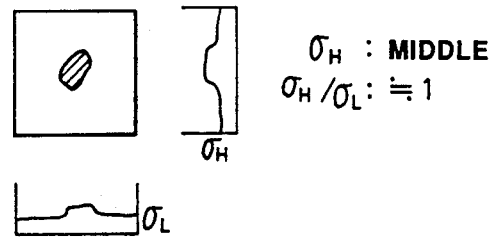
FIG. 9(b) PIT
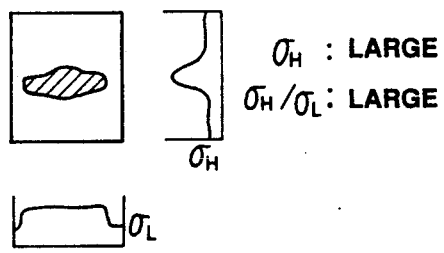
FIG. 9(c) SIMPLE LINE
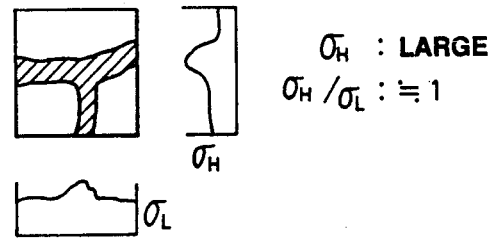
FIG. 9(d) BRANCH
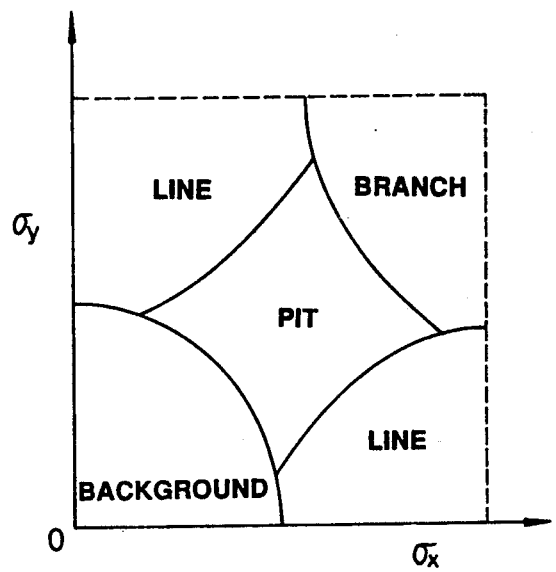
FIG. 10

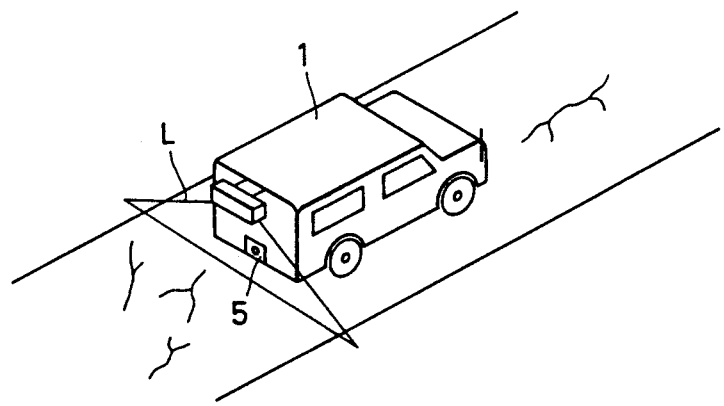
FIG.15
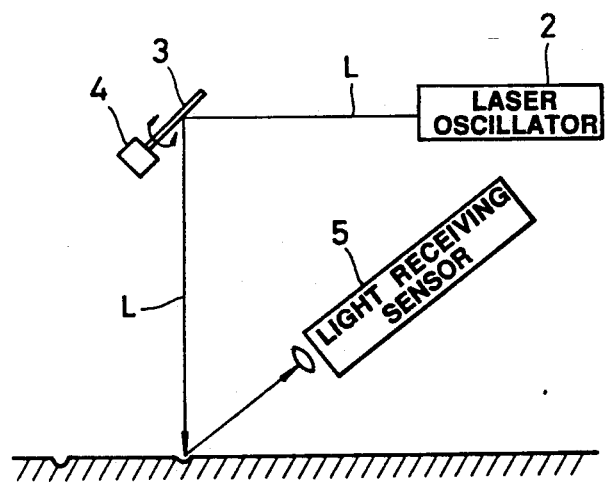
FIG.16
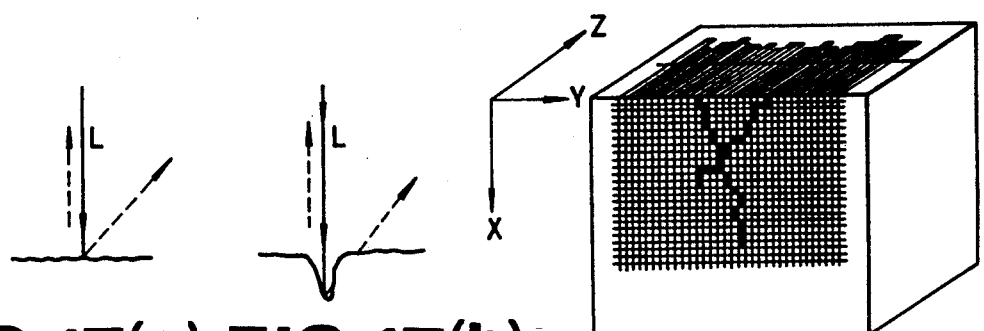
FIG.17(a)  FIG.17(b)
FIG.18

LINEAR PATTERN RECOGNIZING METHOD

TECHNICAL FIELD

This invention relates to a linear pattern recognizing method of automatically recognizing and extracting a linear pattern included in the image data which are stored in an original image memory.

BACKGROUND ART

A variety of methods have been proposed in the art to automatically detect cracks, uneven parts, etc. of a road surface or tunnel wall, which are heretofore detected visually. For instance Japanese Patent Application Nos. 229563/1983 and 233923/1954 have disclosed the following method: As shown in FIGS. 15 and 16, a laser scanning system comprising a laser oscillator 2, a mirror 3 and an electric motor 4, and a light receiving sensor 5, a distance recorder (not shown) are mounted on a vehicle 1. The road is scanned with the laser beam in a road crossing direction, and light scattered from the road is received by the light receiving sensor 5. When, in this case, there are no cracks or the like in the road surface to which the laser beam is applied, as shown in the part (a) of FIG. 17 a predetermined quantity of scattered light is received by the light receiving sensor 5. When, on the other hand, there are cracks or the like in the road surface, as shown in the part (b) of FIG. 7, the quantity of light received by the light receiving sensor 5 is greatly reduced because of a shadow effect. In addition, in the method proposed, the output of the light receiving sensor 5 together with the output of the distance recorder is recorded by a video tape recorder (VTR) or the like, and then stored in a special purpose image memory. The data stored in the image memory are as shown in FIG. 18: that is, the X-direction address represents a vehicle traveling direction, the Y-direction address, a road crossing direction, and the Z-direction address, data (multi-gradation or binary data) on cracks. That is, the magnitude, position and configuration of an uneven part such as a crack can be detected by analyzing the data thus stored.

On the other hand, the method of automatically recognizing cracks using such as a road surface image has demanded for provision of a technique of detecting a linear pattern such as a crack with high accuracy because of the following reasons:

(I) There are a lot of noises because a road includes aggregate etc.

(II) Cracks are locally changed in direction and in width.

(III) There are a number of uncontinuous parts, cracks occurring intermittently.

(IV) The road surface condition depending greatly on the environmental conditions, construction method, etc. of the road, a variety of noises are superposed on one another. And formed crack patterns are not uniform; there may be formed lateral cracks, or honeycomb cracks.

Examples of a conventional linear pattern recognizing method are as follows:

(1) An image different in density is converted into binary data, to extract the region of dark (or light) lines, and thereafter a line thinning operation is carried out, to recognize the line.

(2) It is determined through correlation with a line detecting operator that there is a line in the high correlation region.

(3) The densities of picture elements in a plurality of directions of a point is summed up to obtain a line existing direction with respect to the point. This operation is repeatedly carried out in a follow-up mode, to recognize the line.

In addition, in the field of a character recognizing technique, the following methods are available:

(4) The black signal of a binary image is counted both in the X-direction and in the Y-direction, and a projection waveform is formed with the count values as waveform values, and collation is made with the reference pattern, to recognize the character.

(5) The region where lines are concentrated as in a character region is extracted from the result of projection of a wide region, and after each character is taken out of it, the projection waveform is collated with the reference pattern, to recognize the character.

The above-described conventional techniques (1), (2) and (3) are still disadvantageous in the following points: In general, they are weak against noise, and they are low in recognition accuracy although performing intricate operations. Hence, they are not applicable to the field of detecting cracks etc. of a road surface where a lot of noise components are generated, and the lines formed therein are intricate in configuration.

In general, an operation of projection has an effect that density is averaged in the direction of projection. Therefore, in the above-described conventional techniques (4) and (5) in which a wide region is projected, it is difficult to recognize a thin linear pattern, and even if the projection is made in the line existing direction, it is impossible to recognize an intricate line such as a crack. Those techniques suffer further from the difficulty that it is necessary to provide the reference pattern for recognition.

Accordingly, an object of this invention is to eliminate the above-described difficulties. More specifically, an object of the invention is to provide a linear pattern recognizing method which can detect an intricate linear pattern such as cracks in a road surface with high accuracy.

Another object of the invention is to provide a linear pattern recognizing method which can detect especially a branch of an intricate linear pattern such as cracks in a road surface.

A further object of the invention is to provide a linear pattern recognizing method which can accurately perform a line detecting operation even in the case of a directional image which is formed for instance by a flying spot method.

DISCLOSURE OF THE INVENTION

In the invention, the memory region of an original image memory in which original image data have been stored is divided into a plurality of smaller regions, and the image data of the smaller regions are utilized to obtain projection waveforms at a plurality of projection angles for each smaller region. The projection waveforms thus obtained are analyzed to detect the presence or absence, line direction, line width and line length of a linear pattern in each smaller region. According to the results of detection, a linear segment corresponding to the linear pattern is extracted for each smaller region.

The projection waveforms at the plurality of projection angles are obtained for each smaller region as follows: A dividing slit is provided for dividing the memory region of the original image memory into a plurality of smaller region, and the dividing slit is rotated with the image fixed, or the image is rotated with the dividing slit fixed. With respect to the rotated slit region thus obtained, projection waveforms in the x-direction and in the y-direction for instance are obtained. Those projection waveforms are analyzed to determine the line direction, line width and line length of a linear pattern for defining the configuration and direction of a linear segment.

Hence, according to the invention, a linear pattern can be recognized with high accuracy which is included in an image which has intricate lines such as cracks and has a lot of noise components. In addition, even a linear pattern which is changed locally in width and in direction can be readily recognized as a linear segment by analysis of the projection waveforms without complicated operations. Furthermore, it is unnecessary to use a standard pattern such as a line detecting matching pattern, as a result of which a linear pattern to be recognized is not limited in width, length and direction. If the smaller regions are defined in such a manner that each of them overlaps the smaller regions adjacent thereto, then the difficulty can be eliminated that a linear pattern is not completely detected because of the rotation of the slit.

Furthermore, in the invention, in analyzing of the projection waveforms, the projection waveforms obtained at the projection angles are normalized with predetermined functions having at least the projection angles as variables, and the projection waveforms thus normalized are utilized to determine the line direction, line width and line length of the linear pattern in each smaller region. As a result, the directional effect of the measured image is corrected. That is, in the case where the image data are directional, or directional background noise components are included, or the image (density and contrast) of a linear object differs depending on directions, the line direction and line width can be detected with high accuracy, and the difficulty is eliminated that the background noise components are recognized as linear objects. Thus, the line detecting operation is carried out with high stability.

Furthermore, in the invention, after extraction of the linear segments, the positional relationships of the smaller regions including a linear pattern are determined, and the results of determination are utilized to select interpolation regions for reprojection, and for each of the interpolation regions thus selected an operation of extracting the linear segment is carried out, so that the difficulty is positively eliminated that the line in the region boundary is not completely detected because of rotation of the image or the slit. In other words, first the image data is divided coarsely, and the projection waveforms are analyzed; and thereafter according to the positional relationships of the regions which are determined to include a linear pattern, interpolation regions for reprojection are selected, and for the interpolation regions thus selected the projection waveforms are analyzed.

Furthermore, in the invention, in association with the extraction of the linear segments, for each region the standard deviation of the projection waveform in the line direction determined before is obtained and utilized to determine whether or not the object to be recognized therein is a branch. When it is determined that a region has a branch, the region is further divided into smaller parts, and for each of the smaller parts the projection waveforms are analyzed in the same manner. Thus, the branch can be accurately detected with the smoothing effect maintained unchanged. In order to detect the branch with high accuracy, the region should be divided into smaller parts in such a manner that each of the smaller parts overlaps with the smaller parts adjacent thereto.

BRIEF DESCRIPTION OF THE DRAWINGS

FIG. 2 is an explanatory diagram showing two methods of obtaining a rotated slit region.

FIG. 3(a)–3(b) is an explanatory diagram showing explanatory diagram showing examples of images obtained according to a flying spot method.

FIG. 4(a)–4(c) is an explanatory diagram for a description of a method of correction which is employed in the case where image data is directional.

FIG. 6(a)–6(e) is an explanatory diagram for a description of a method of interpolating line lacks by overlapping.

FIGS. 9(a)–9(d) and 10 are explanatory diagrams showing examples of the classification of projection waveform patterns for decision of the presence of a branch.

FIG. 15 is a perspective view showing a measuring vehicle for detecting cracks in a road surface.

FIG. 16 is an explanatory diagram outlining a method of forming the image of cracks in a road surface.

FIGS. 17(a)–17(b) is an explanatory diagram showing the scattering of a laser beam.

FIG. 18 is an explanatory diagram showing images data stored in an image memory.

BEST MODE FOR CARRYING OUT THE INVENTION

Figure 1A:
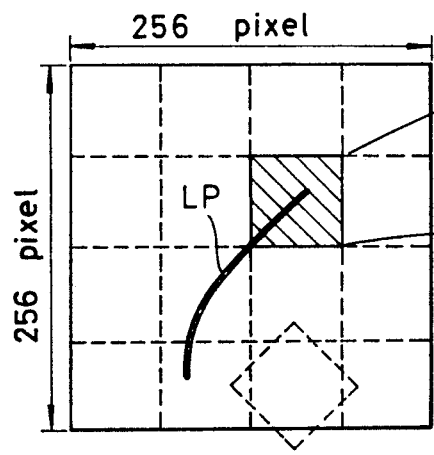
FIG. 1(a)–1(e) is an explanatory diagram for a description of the fundamental technical concept of this invention.
Figure 1B:
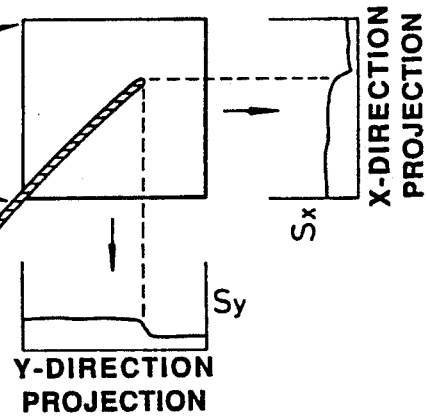
Figure 1C:
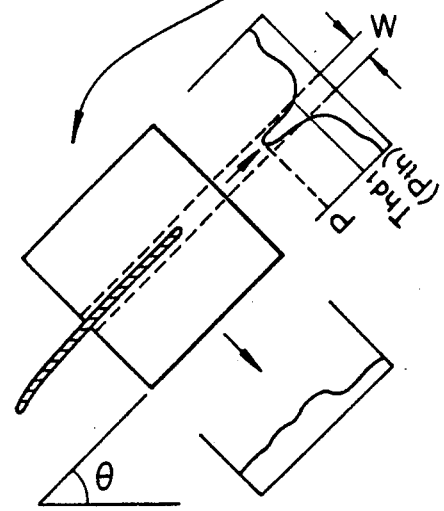
Figure 1D:
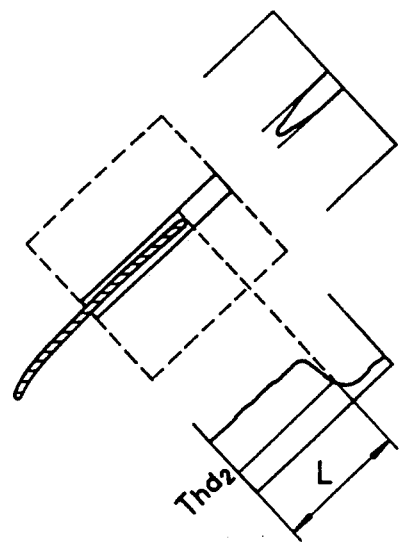
Figure 1E:
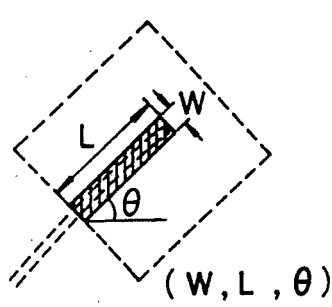

Embodiments of this invention will be described with reference to the accompanying drawings.

First, the fundamental technical concept of one embodiment of the invention will be described with reference to FIG. 1.

Let us consider an image which, as shown in the part (a) of FIG. 1, is made up of 256 picture elements×256 picture elements including a linear pattern LP. In this case, each picture element consists of 8 bits for instance, and it is multi-density data capable of representing 1 through 256 gradations. As indicated by the broken line in the part (a) of FIG. 1, 4×4 square slits are applied to the image, so that the latter is divided into 4×4 square mesh regions. Then, as shown in the part (b) of FIG. 1, the projection waveforms of the divided mesh regions (hereinafter referred to as "slit regions", when applicable) are obtained in the X-direction and in the Y-direction. In this case, the projection waveform values $S_x$ and $S_y$ are represented by $\Sigma D_i/n$ ($D_i$ is the density data). If it is assumed that the linear pattern is larger in density than the background, the projection waveform values of the region of the linear pattern are larger than those of the other regions as shown in the part (b) of FIG. 1.

Next, in each slit region, the slit is repeatedly turned about the slit center through a predetermined angle in the range of 0° to 90°, and the projection waveforms thereof are obtained every turn of the slit. There are available two methods of obtaining the projection waveforms of the slit thus turned; in the first method, the slit is turned with the image fixed, and in the second method, the image is turned in the opposite direction with the slit fixed, as shown in FIG. 2. In the two methods, the resultant projection waveforms are the same. The term "slit" as used herein is intended to mean what is used to recognize the region for projection waveform calculation. In obtaining the slit projection waveforms, irrespective of the rotation of the slit (or image) the average densities of picture trains in parallel with the sides of the slit are obtained. In this case, the dots of the slit region turned do not coincide with those of the image before turned. Therefore, the densities of the dots of the slit region turned are determined by the interpolation of obtaining the weighted mean of the densities of four picture elements, for instance, surrounding each dot.

When the projection waveforms are obtained every angle of rotation, then the projection waveform along the linear pattern LP is such that, as shown in the part (c) of FIG. 1, its peak P becomes maximum when the slit turns through a predetermined angle $\theta$, whereby the linear pattern existing direction $\theta$ can be determined.

It is determined according to the value of the peak P whether or not the linear pattern is truly located in the line direction $\theta$ thus obtained.

For instance, the peak value P is compared with a predetermined threshold value $P_{th}$:

When $P \geq P_{th}$, it is determined that the linear pattern is located in the line direction, and When $P < P_{th}$, it is determined that the linear pattern is not located in the line direction.

The threshold value $P_{th}$ is determined according to the following equation (1) for instance:

$$P_{th} = \alpha \cdot S_{av} + \beta (\alpha \geq 1) \tag{1}$$

where $S_{av}$ is the average density of the entire image (256× 256 picture elements), and $\alpha$ and $\beta$ are the weight coefficient and the correction coefficient which have been obtained through experiments, respectively.

Next, the line width W of the linear pattern is determined as follows: That is, as shown in the part (c) of FIG. 1, with the projection waveform processed with a predetermined threshold value $Thd_1$, the length of the cut line of to the peak is the line width W. The threshold value $Thd_1$ may be the above-described threshold value $P_{th}$ which is used for determination of whether or not the linear pattern is located in the line direction, or it may be set to a suitable value other than those.

The length L of the linear pattern is determined as follows: As shown in the part (d) of FIG. 1, the width of the slit region is limited to the crack width W which has been detected, and the projection waveforms of the slit region thus limited are obtained. The projection waveform along the length of the slit region is processed with a predetermined threshold value $Thd_2$, so as to determined the linear pattern length L in the slit region. This is based on the fact that, with a simple square slit, the waveform along the line shows the peak clearly, while in the waveform in the widthwise direction the peak is low in contrast. The threshold value $Thd_2$ may be, for instance, the above-described threshold value $P_{th}$ used for determination of whether or not the linear pattern is located in the line direction, or it may be the average density $S_{av}$ of the entire image.

By analyzing the projection waveform in the above-described manner, the linear pattern in one slit region can be recognized as a rectangular pattern the width W, length L and direction $\theta$ of which have been known, as shown in the part (e) of FIG. 1. This pattern will be referred to as "a linear segment", when applicable. When all the mesh regions in the part (a) of FIG. 1 are processed in the above-described manner, then for each mesh region, the linear segment whose width W, length L and location $\theta$ are known can be obtained.

For determination of the above-described direction $\theta$, line width W and the presence or absence of a line, a standard deviation $\sigma$ may be employed.

In this case, when the slit region is repeatedly turned through a predetermined angle, the standard deviation $\sigma$ of the projection waveforms is obtained for each slit region turn, and the angle of rotation $\theta$ provided when the standard division becomes maximum is determined as the line direction.

In order to determine the presence or absence of a line in the direction thus determined, the standard deviation of the projection waveform in the direction $\theta$ is compared with a predetermined threshold value $\sigma_{th1}$:

When $\sigma \geq \sigma_{th1}$, a line is present; and when $\sigma < \sigma_{th1}$, no line is present.

The threshold value $\sigma_{th1}$ is determined according to the following equation (2) for instance:

$$\sigma_{th1} = \Gamma \cdot \sigma_{av} + \delta(\Gamma \geq 1) \tag{2}$$

where $\sigma_{av}$ is the average of the standard deviations of the projection waveforms obtained with the meshes of the entire image, and $\Gamma$ and $\delta$ are the weight coefficient and the correction coefficient, respectively, which are obtained through experiments.

As was described above, the line direction $\theta$ is obtained from the slit turn angle provided when the standard deviation of the projection waveform becomes maximum. However, in the case where the invention is applied to the road surface image measurement which has been described with reference to FIGS. 15 through 18, it is preferable to perform the following correction: The road surface image measurement is based on the principal of the flying spot method in which a laser beam scans a road in such manner that it go across the road, and it is so designed that the unevenness is emphasized in the road crossing direction because of the geometrical positional relationship between the laser and the detector. The part (a) of FIG. 3 shows the state of a road surface. When a crack CR and large recesses g in the part (a) of FIG. 3 are image-formed by the flying spot method, they appear as shown in the part (b) of FIG. 3; that is, the crack CR and the recesses g are elongated laterally. In the part (b) of FIG. 3, reference character m designates the shadows of very small recesses. Hence, the standard deviation of the projection waveform in the road crossing direction is larger than that of the projection waveform in the direction of longitudinally traversing the road. Therefore, in order to obtain a crack direction from the standard deviation, the correction should be provided depending on the direction.

As for the correction, as shown in the parts (a) and (b) of FIG. 4 for each projection slit region not turned, the standard deviations $\sigma_x(i, j)$ and $\sigma_y(i, j)$ in the horizontal direction and in the vertical direction of the image are obtained, and the average values $\sigma_x$ and $\sigma_y$ of them with respect to the entire image are obtained according to the following equations (3) and (4):

$$\sigma_x = \Sigma\Sigma\sigma_x(i, j)/(4\times 4) \qquad (3)$$

$$\sigma_y = \Sigma\Sigma\sigma_y(i, j)/(4\times 4) \qquad (4).$$

Next, the slit is turned through an angle $\theta$, and the estimated value $\sigma(\theta)$ of the standard deviation of the projection waveform in that direction is obtained according to the following equation (5) with the average values $\sigma_x$ and $\sigma_y$ distributed proportionally with the angle of rotation $\theta$:

$$\sigma(\theta) = ((90-\theta)\sigma_x + \theta\sigma_y)/90 \qquad (5).$$

Then, the standard deviation $\sigma$ of the slit projection waveform is normalized according to the following equation 6 by using the estimated standard deviation $\sigma(\theta)$ with the $\theta$ as a variable:

$$\epsilon = \sigma/(\sigma(\theta)) \qquad (6).$$

In the above-described equation, $\sigma(\theta)$ and $\sigma$ are obtained with one and the same angle of ration.

The value $\epsilon$ of each angle of rotation is obtained, and the angle of rotation $\theta$ provided when the value $\epsilon$ becomes maximum is determined as the crack direction. In this case, the crack direction can be determined without being affected by the directivity of the measured image.

After the crack existing direction $\theta$ is obtained, the presence or absence of the crack is determined as follows: That is, only when the normalized standard deviation $\epsilon$ is equal to or higher than 1 for instance, it is determined that the crack exists. The value one (1) has been obtained experimentally and statistically, and it can be represented by the following general equation:

$$\epsilon = \sigma/\sigma_{av} = \Gamma + \delta/\sigma_{av}$$
$$(\epsilon = 1 \text{ when } \Gamma = 1 \text{ and } \delta = 0)$$

That is, only when it is larger than the average waveform dispersion attributing to the noise components of the image, it is determined that there exists an object.

Figure 5A:
FIG. 5(a)–5(c) is an explanatory diagram for a description of one example of an operation of obtaining a line width W.
Figure 5B:
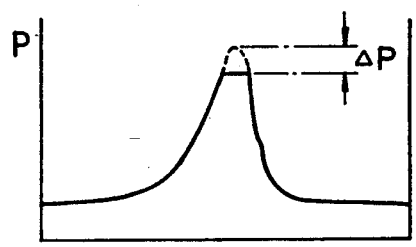
Figure 5C:
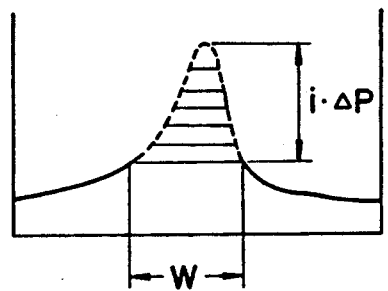
Figure 7A:
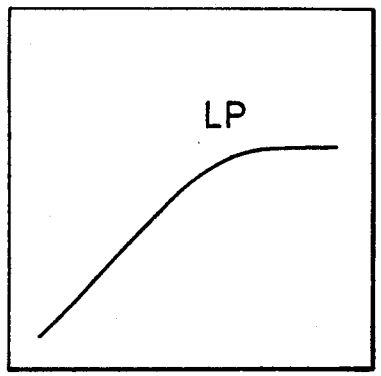
FIG. 7(a)–7(f) is an explanatory diagram for a description of a method of interpolating line lacks according to an interpolation position determining method.
Figure 7B:
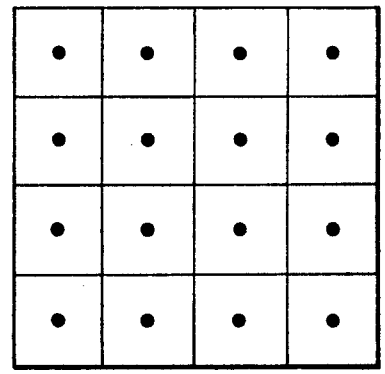
Figure 7C:
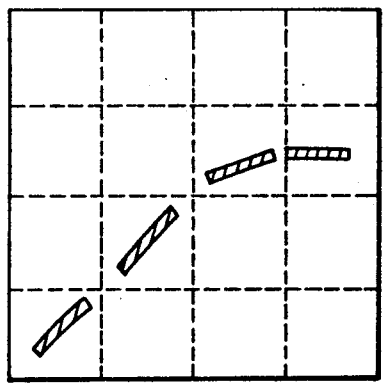
Figure 7D:
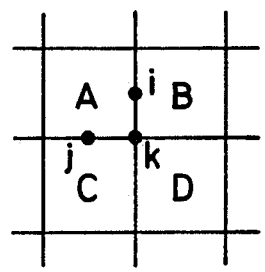
Figure 7E:
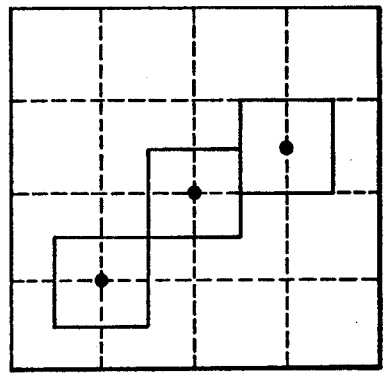
Figure 7F:
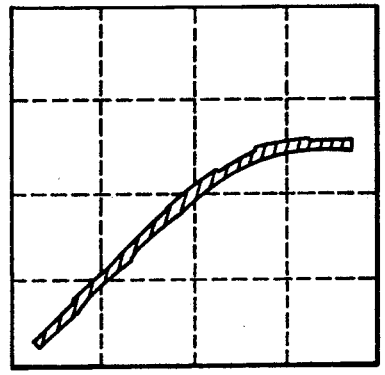
Figure 8A:
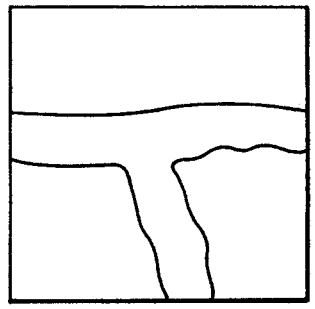
FIG. 8(a)–8(e) is an explanatory diagram for a description of extracting a linear segments in a region including a branch.
Figure 8B:
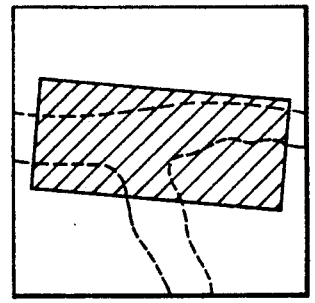
Figure 8C:
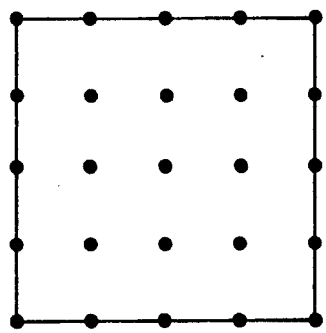
Figure 8D:
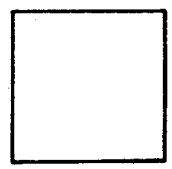
Figure 8E:
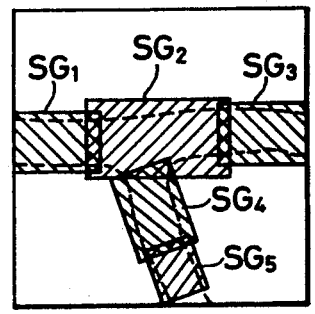

The line width W may be determined according to a procedure shown in FIG. 5. That is, the projection waveform in the direction $\theta$ is processed with the threshold value $(P-\Delta P)$ which is obtained by subtracting $\Delta P$ from its peak value P, and the standard deviation $\sigma$ is obtained with respect to the waveform which is formed by replacing the part larger than the threshold value $(P-\Delta P)$ with the value $(P-\Delta P)$. When the $\sigma$ meets the following condition, then the length of the cut line of the peak is selected as the line width W:

$$\sigma \leq \sigma_{th2} \quad (\sigma_{th2} \text{ is the width determining threshold value})$$

However, when $\sigma > \sigma_{th2}$, then the processing is carried out with a threshold value $(P-2\Delta P)$. The same processing is performed repeatedly until the condition $\sigma \leq \sigma_{th2}$ is satisfied. And the length of the cut line of the peak is employed as the line width W. The step $\Delta P$ of the threshold value may be for instance the quantized step (one gradation per 256 gradations) of a digital image, and the threshold value $\sigma_{th2}$ may be the above-described threshold value $\sigma_{th1}$ $(=\Gamma\sigma_{av}+\delta)$. In determining the line width, the threshold value $\sigma_{th2}$ should be corrected by the normalization described with reference to FIG. 4, because the line width W can be determined more accurately independently of the effect of the directivity of the measured image.

In addition, the line width W may be determined as follows: The average value of the waveforms processed with a threshold value $(P-i\cdot\Delta P,$ where $i = 1, 2, \dots )$ is obtained. And the processing substantially equal to that which has been described above is carried out until the average value becomes lower than a predetermined threshold value, so that the length of the cut line of the peak provided when the condition is met is employed as the line width W.

Now, let us consider the recognition of a linear pattern LP as shown in the part (a) of FIG. 6. When, with a $4\times 4$ square mesh as shown in the part (b) of FIG. 6 as a slit region, the analysis is carried out in the above-described manner with each dot as a slit rotation center, the linear pattern is often recognized as discontinuous linear segments as shown in the part (c) of FIG. 6. This is due to the fact that, when each slit is turned, parts not included by the slit region occur in the vicinity of the slit's boundary. Therefore, even if a line exists in the parts, the resultant image is incomplete. In order to eliminate this difficulty, in the embodiment, as shown in the part (d) of FIG. 6 the slit rotation centers are arranged at intervals of a half ($\frac{1}{2}$) of the slit length with the slit length maintained unchanged, so that the projection regions are overlapped with one another. In this case, the resultant image is provided as continuous linear pattern as shown in the part (e) of FIG. 6.

Thus, all the parts of the linear pattern can be recognized with the slit projection positions overlapped completely. In this connection, the operating time can be reduced by a method as shown in FIG. 7.

In the method, first for a linear pattern LP as shown in the part (a) of FIG. 7, a coarse slit projection is carried out without overlapping as shown in the part (b) of FIG. 7, thereby to detect linear segments as shown in the part (c) of FIG. 7. And at each interpolation position, a projection is performed again. For instance in the case where, in the part (d) of FIG. 7, linear patterns are detected with the slits A and B, then the reprojection is performed with the position i. Similarly, when linear patterns are detected with the slits A and C, the reprojection is performed with the position j; and when linear patterns are detected with the slits A and D, the reprojection is carried out with the position k. In this case, the reprojection is carried out at the three positions as shown in the part (e) of FIG. 7, and a continuous linear pattern as shown in the part (f) of FIG. 7 is obtained through the reprojections. Thus, the method can reduce the operating time with the detecting capacity maintained unchanged.

For instance in the case where the overlap method shown in FIG. 6 is employed, the projection is carried out 49 (7×7) times; whereas in the case where the interpolation method shown in FIG. 7 is used, it is carried out only 19 (4×4+3) times.

Now, a branch determining method and a slit projection method in the case where a linear pattern has a branch will be described.

If, in the case where a linear pattern has a branch as shown in the part (a) of FIG. 8, the slit size is large, the rectangular linear segment obtained through recognition is as shaded in the part (b) of FIG. 8; that is, sometimes it is impossible to clearly express the branch. This difficulty may be overcome by decreasing the slit size. However, if the image is processed, in its entirety, with the slit size reduced, then in proportion to the slit size the smoothing effect of the projection is decreased, so that noises are recognized erroneously. Therefore, in the embodiment, it is determined whether or not a linear patter has a branch in each slit region, and only for the slit region having a branch the reprojection is carried out with the slit size reduced.

With the slit turned in the line existing direction $\theta$, the projection waveforms in the x- and y- directions of the slit are obtained. And the smaller of the standard deviations of those projection waveforms is represented by $\sigma_H$, and the other by $\sigma_L$. Under this condition, those standard deviations $\sigma_H$ and $\sigma_L$ have been investigated with respect to a variety of images, and it has been found that the images patterns in the slit regions can be classified as shown in FIG. 9 according to the standard deviations $\sigma_H$ and $\sigma_L$. That is, the part (a) of FIG. 9 shows the background having no linear pattern nor branch. In this case, $\sigma_H$ is small, and is substantially equal to $\sigma_H(\sigma_H/\sigma_L \approx 1)$. The part (b) of FIG. 9 shows a pit. In this case, $\sigma_H$ is middle, and $\sigma_H/\sigma_L \approx 1$. The part (c) of FIG. 9 shows a simple line such as a crack. In this case, $\sigma_H$ is large, and therefore $\sigma_H/\sigma_L$ is also large. The part (d) of FIG. 9 shows a branch. In this case $\sigma_H$ is large, and $\sigma_H/\sigma_L$ is one (1). These relationships are can be indicated in a $\sigma_x$-$\sigma_y$ coordinate system as shown in FIG. 10. Therefore, it can be determined according to the relationships whether or not there is a branch in the slit region. More specifically, the standard deviations $\sigma_x$ and $\sigma_y$ of the slit projection waveform in the line existing direction are obtained, and it is detected where those values are located in the graph of FIG. 10. When it is detected that they are located in the "branch" region of the graph, then it is determined that the object in the slit region is a branch. The boundaries of the regions in the graph are determined statistically and experimentally.

When it is determined by the above-described method that a slit region has a branch, then a slit which is ¼ of the initial slit (shown in the parts (a) and (b) of FIG. 8) is used for it, and the reprojection is carried out with the projection regions overlapped turning about the dots shown in the part (c) of FIG. 8. With the reprojection, the branch pattern as shown in the part (a) of FIG. 8 can be recognized as the combination (logic OR) of rectangular linear segments SG₁ through SG₅ (shaded) as shown in the part (e) of FIG. 8; that is, the branch can be reproduced with high accuracy.

Figure 11:
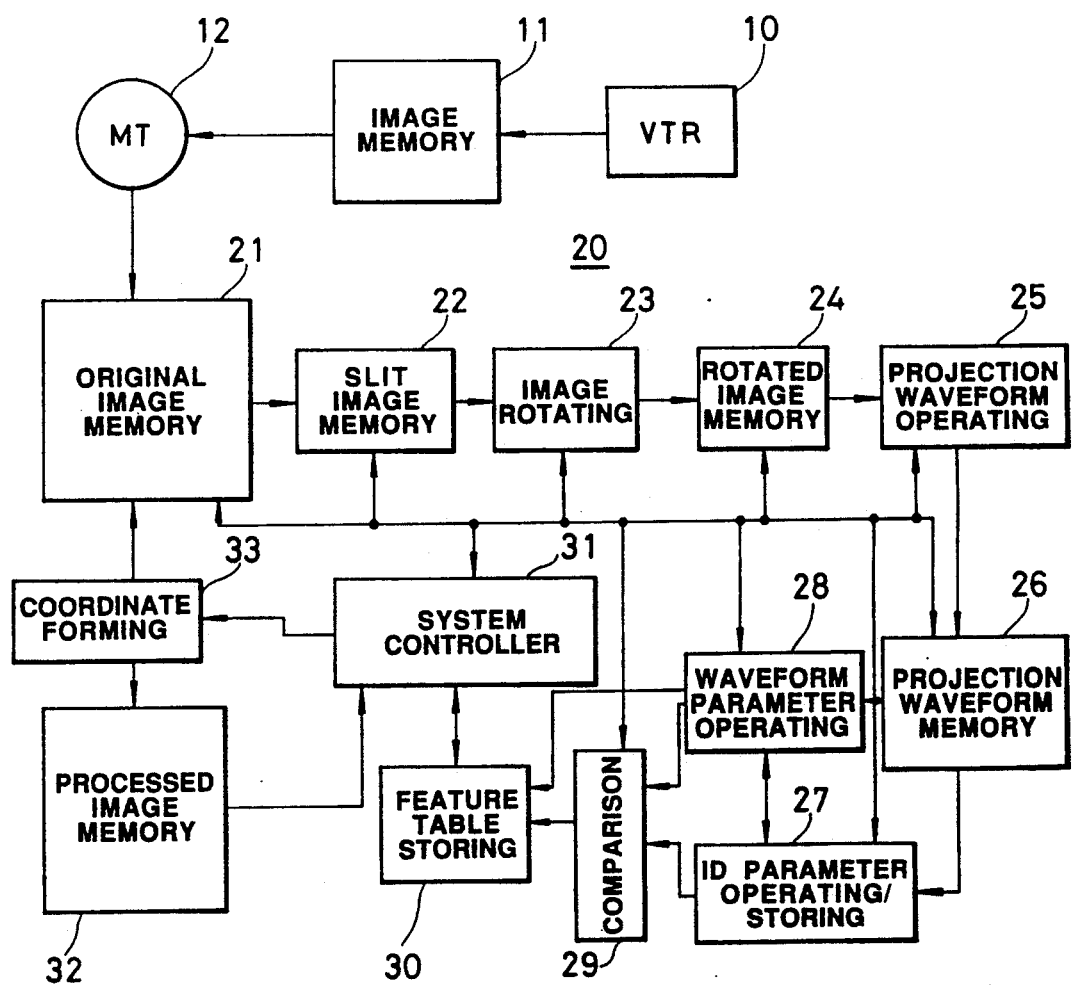
FIG. 11 is a block diagram showing the arrangement of an apparatus for practicing the method according to the invention.

FIG. 11 shows the arrangement of one example of a system for practicing the above-described linear pattern recognizing method which is applied to the detection of cracks in the road surface in FIGS. 15 through 18.

The image data obtained by sampling the road surface with a predetermined pitch (for instance 1 mm) in the longitudinal direction are recorded in a VTR 10, and transferred to an image memory 11 off-line, and then recorded in a magnetic tape 12. The image data stored in the magnetic tape 12 are inputted into a linear pattern recognizing unit 20 off-line. It is assumed in this connection that, with 256×256 picture elements as one unit, image data having 8 bits per picture element is inputted from the magnetic tape 12 into an original image memory 21.

The linear pattern recognizing unit 20 comprises: the original image memory 21 in which image data of 256×256 picture elements (one picture element: 8 bits) is stored; a slit image memory 22 for storing the image data which are read out of the original image memory 21 substantially per slit; an image rotating circuit 23 for repeatedly rotating the image data of the slit image memory 22 through a predetermined angle according to an instruction from a system controller 31 and outputting them; a rotated image memory 24 for storing the image data thus rotated; a projection waveform operating circuit 25 for reading image data from the rotated image memory 24 to obtain the projection waveforms in two directions, the x-direction and the y-direction, in a slit region; a projection waveform memory 26 for storing the projection waveforms provided with each angle of rotation; an identifying parameter operating and storing circuit 27 for operating and storing identifying parameters such as the average density $S_{av}$ of the entire image necessary for analysis of the projection waveforms, and the average standard deviation $\sigma_{av}$ of the entire image, and calculating and storing the necessary threshold value $P_{th}$, Thd₁, Thd₂, $\sigma_{th1}$ or $\sigma_{th2}$; a waveform parameter operating circuit 28 for obtaining a standard deviation $\sigma$ or peak value P from the projection waveform provided with each angle of rotation, to calculate a line direction $\theta$, line width W and line length L; a comparison circuit 29 for subjecting the outputs of the waveform parameter operating circuit 28 and the identifying parameter operating circuit 27 to comparison; a feature table storing circuit 30 for storing feature parameters such as a line direction $\theta$, line width W and line length L obtained from the results of comparison; a coordinate forming circuit 33 for forming addresses (coordinates) for the original image memory 21 and a processed image memory 32; the processed image memory 32 for display which stores the binary image data of rectangular linear segments recognized; and the system controller 31 made up of MPU or the like for controlling the operations of the above-described circuit elements.

Figure 12:
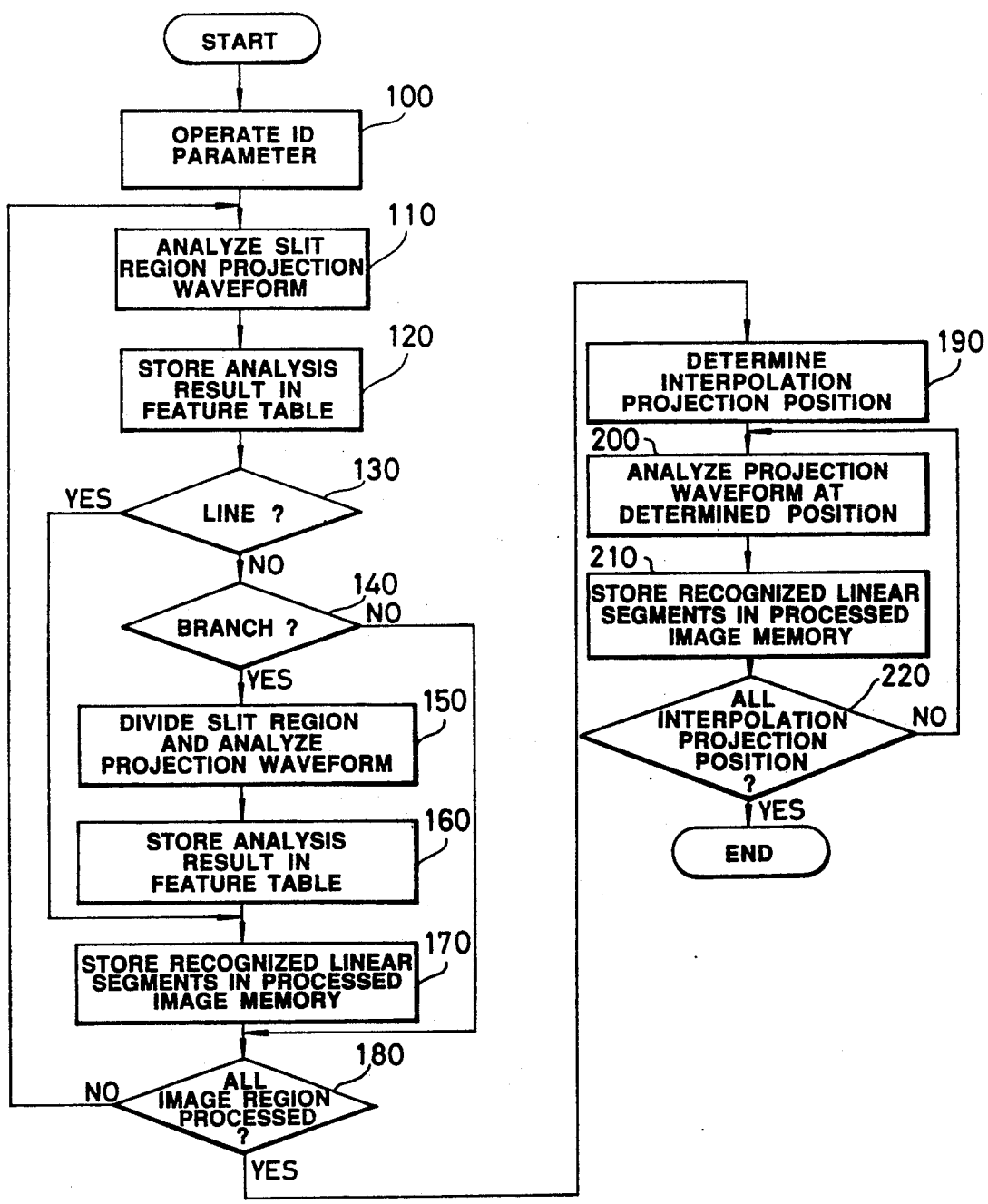
FIG. 12 is a flow chart for a description of one example of the operation of the apparatus shown in FIG. 11.

One example of the operation of the system thus organized will be described with reference to FIG. 12, a flow chart. In this connection, it is assumed that the image data of 256×256 picture elements (one picture element consisting of 8 bits) as shown in FIG. 1 is stored in the original image memory, and similarly the 4×4 square slit is applied thereto. In this case, in obtaining rotated projection waveforms, the image is rotated in the $-\theta$ direction with the slit fixed. In addition, the method of using the standard deviation $\sigma$ is employed for determination of the line direction $\theta$ and for determination of the presence or absence of a line. The method described with reference to FIG. 5 is employed to determine the line width W. In determining the line length L, the peak threshold value $P_{th}$ for determination of the presence or absence of a line is used as the threshold Thd$_2$. Furthermore, the interpolation method described with reference to FIG. 7 is employed so as to detect a linear pattern in its entirety.

Before analyzing the projection waveforms of an image rotated, the system controller 31 operates to obtain identifying parameters such as an average density $S_{av}$ and an average standard deviation $\sigma_{av}$ (Step 100). The system controller 31 controls the coordinate forming circuit 33 to output a memory address so that image data corresponding to a slit region are transferred from the original image memory 21 into the slit image memory 22. In the identifying parameter operation, the image rotating circuit 23 operates to cause the data stored in the slit image memory 22 to be stored in the rotated image memory 22 without rotation. The projection waveform operating circuit 25 reads the not rotated image data from the rotated image memory 24, obtains the x-direction and y-direction projection waveforms in the slit region in the manner described with reference to the part (b) of FIG. 1, and stores the resultant projection images in the projection waveform memory 26. The waveform parameter operating circuit 28 obtains the average density d (1,1) and standard deviations $\sigma(1,1)$ according to the contents of the projection waveform memory 26. This operation is carried out for all the slit regions (not overlapped). That is, the waveform parameter operating circuit 28 obtains the average densities d (1,1), d(1,2) ... and d(4,4) and the standards deviations $\sigma(1,1)$, $\sigma(1,2)$ ... and $\sigma(4,4)$ of all the slit regions (cf. the part (b) of FIG. 4). These average densities and standard deviations are applied to the identifying parameter operating circuit 27, where they are averaged to provide the average density $S_{av}$ and average standard deviation $\sigma_{av}$ of the entire original image. The identifying parameter operating circuit 27 stores those average values $S_{av}$ and $\sigma_{av}$, and obtains the peak threshold value $P_{th}$ and the standard deviation threshold value $\sigma_{th1}$, which are used for analysis of the projection waveforms.

Figure 13:
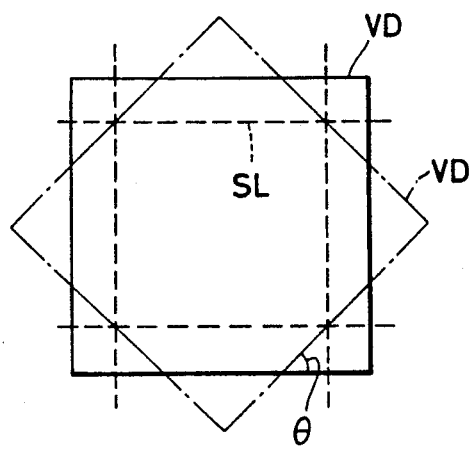
FIG. 13 is an explanatory diagram for a description of a method of reading data from an original image memory.

Next, the system controller 31 operates to analyze the projection waveforms of the rotated image. In this case, the system controller 31 operates to cause the coordinate forming circuit 33 to provide coordinates with which, as shown in FIG. 13, the image data of a slightly larger region (as indicated by the solid line) is read out of the original image memory 21; that is, when an image VD is rotated, the image data is contained in the region of the fixed slit SL (indicated by the broken line) at all times. The image data thus read is stored in the slit image memory 22. The image rotating circuit 23 operates to rotate the image data stored in the slit image memory through a predetermined angle in response to an instruction form the system controller 31, and transmits the image data thus rotated to the rotated image memory 24. In this operation, the image rotating circuit 23 carries out the above-described interpolation utilizing the weighted density means of four picture elements adjacent thereto in order to correct the shift of the grid point due to the rotation. The projection waveform operating circuit 25 reads the stored data from the rotated image memory 24, to obtain x-direction and y-direction projection waveforms in the slit region in the manner described with reference to the part (b) of FIG. 1 and causes the projection waveform memory 26 to store the projection waveforms thus obtained. Thereafter, the system controller 31 applies the next angle of rotation to the image rotating circuit 23. And the same operations are carried out, so that the projection waveforms with the angle of ration are stored in the projection waveform memory 26. The above-described operations are performed repeatedly until the image has been rotated stepwise in the range of 0° to 90°, so that the projection waveforms with all the angles of rotation are stored in the projection waveform memory 26.

According to the projection waveforms with all the angles of rotation which have been stored in the projection waveform memory 26, the following operation is carried out, to recognize a crack or branch as a linear segment.

First, the waveform parameter operating circuit 28 uses the projection waveforms with all the angles of rotation which have been stored in the projection waveform memory 26, to obtain the standard deviation $\sigma$ for each angle of rotation, and reads the average standard deviations $\sigma_x$ and $\sigma_y$ in the x-direction and y-direction of the whole image from the identifying parameter operating and storing circuit 17, to obtain the estimated standard deviation $\sigma(\theta)$ for each angle of rotation, and utilizes these calculated values $\sigma$ and $\sigma(\theta)$ to obtain the normalized standard deviation $\epsilon(=\sigma/\sigma(\theta))$, and determines as the line direction the angle of rotation $\theta$ provided when the value $\epsilon$ becomes maximum. Thus, by determining the line direction in the above-described manner, the crack direction can be determined correctly without being affected by the directivity of the image measured in the flying spot method. The angle of rotation $\theta$ thus determined is stored in the feature table storing circuit 30. The waveform parameter operating circuit 28 applies the value $\epsilon$ corresponding to the angle of rotation $\theta$ thus determined to the comparison circuit 29, to which a value "1" for instance has been applied by the identifying parameter operating circuit 27. The comparison circuit 29 subjects these values $\epsilon$ and "1" to comparison, and applies the result of comparison to the feature table storing circuit 30. The system controller 31 determines it from the result of comparison that there is a crack when $\epsilon \geq 1$.

In the case where the presence of a crack is determined, the system controller 31 operates to detect a line width W and a line length as follows:

The determination of the line width W is achieved by the method described with reference to FIG. 5. That is, the waveform parameter operating circuit 28 obtains the peak value P of the projection waveform in the crack existing direction $\theta$, processes it with a threshold value (P−ΔP), obtains a standard deviation $\sigma$ concerning the waveform which is obtained by replacing the part larger than the threshold value (P−ΔP) with the value (P−ΔP), and applies the standard deviation thus obtained to the comparison circuit 29. In this operation, the comparison circuit 29 has receives a width determining threshold value $\sigma_{th2}$ from the identifying parameter operating circuit 27 (in this case, instead of $\sigma_{th2}$, the threshold value $\sigma_{th1}$ ($=\Gamma\sigma_{av}+\delta$) for determining the presence or absence of a linear object being used). The comparison circuit 29 subjects those values $\sigma$ and $\sigma_{th2}$ to comparison, and applies the result of comparison to the feature table storing circuit 30. When $\sigma \leq_{th2}$, the system controller 31 applies an instruction signal to he waveform parameter operating circuit 28 to cause the latter to obtain the length of the cut line of the peak at that time, and causes the feature table storing circuit 30 to store it as a line width W. In the case where $\sigma > \sigma_{th2}$, the system controller operates in the same manner with a threshold value (P−2ΔP). That is, the above-described operation is carried out repeatedly until $\sigma \leq \sigma_{th2}$ is satisfied. The length of the cut line of the peak provided when the condition is satisfied is regarded as the line width W, and it is stored in the feature table storing circuit 30. If, in this case, the threshold value $\sigma_{th2}$ is subjected to directional correction by the above-described normalization, then the line width W can be detected with higher accuracy.

In order to determine the line length L, the system controller 31 reads the image data of the region which is limited to the line width W only in the direction of line width, out of the image data stored in the slit image memory 22, and causes the image rotating circuit 23 to rotate it through $-\theta$. The image data thus rotated is stored in the rotated image memory 24. The projection waveform operating circuit 25 obtains the x-direction and y-direction projection waveforms of the image data, and applies them to the projection waveform memory 26 so that they are stored therein. The waveform parameter operating circuit 28 uses a threshold value $T_{th2}(=P_{th}=\alpha \cdot S_{wh}+\beta)$ read out of the identifying parameter operating and storing circuit 27, to process one of the x-direction and y-direction projection waveforms, which is different in direction from the projection waveform whose peak has been obtained, to determine the line length L, and applies the line length to the feature parameter storing circuit 30 so that it is stored therein. In the above-described manner, the width W, length L and direction $\theta$ of the linear pattern in a slit region are detected, and they are stored in the feature table storing circuit 30 (Steps 110 and 120). In the case where, after the direction $\theta$ is determined, it is determined that no line exists, the operations of determining the line width W and the line length L are not carried out, and the projection waveforms of the next slit regions are analyzed.

Next, the system controller 31 operates according to the method described with reference to FIGS. 9 and 10, to determine whether the image recognized in the slit region is a line, or a branch, or others (Steps 130 and 140). When it is a simple linear pattern, the system controller 31 operates to write the rectangular linear segment, which is defined by the line width W, line length L and direction $\theta$ stored in the feature table storing circuit 30, in the corresponding region in the processed image memory 32. In this operation, when the linear segment thus recognized is written in the processed image memory 32, its rotated angle is corrected, so that the image data in the original image memory 21 correspond to those stored in the processed image memory.

When, on the other hand, the object is determined as a branch, the system controller 31 operates to subdivide the image data of the slit region stored in the slit image memory 22 by overlapping in the manner described with reference to FIG. 8, and to make analysis for each of the image data thus subdivided with respect to the rotated projection waveforms thereof similarly as in the above-described case (Step 150). The feature parameters (direction $\theta$, width W and length L) of the subdivided regions are stored in the feature table storing circuit 30 (Step 160). According to those feature parameters, the system controller operates to reconstruct the linear segment in the slit region, and to write it in the corresponding region in the processed image memory 31. Thus, an intricate branch pattern can be reproduced with high accuracy.

The above-described operations are carried out for all of the 4×4 slit regions (Step 180), the linear pattern stored in the original image memory 21 is reproduced as the sum (OR) of the rectangular linear segments in the processed image memory 32.

Next, the system controller 31 operates to reproduce a line pattern completely. First, the system controller 31 identifies, of the 4×4 slit regions, the region in which a linear object exists, and determine, in response to the identification, an interpolation position for reprojection in the manner described with reference to the part (e) of FIG. 7 (Step 190). And the system controller 31 reads the image data from the original image memory which corresponds to the one interpolation position thus determined, and operates to analyze the image data thus read with the projection waveform rotated similarly as in the above-described case. The results of analysis (W, L and $\theta$) are stored in the feature table storing circuit 30 (Step 200). The system controller 31 writes the rectangular linear segment defined by the feature parameters (W, L and $\theta$) in the corresponding interpolation position in the processed image memory 32. The above-described operation is carried out for all the reprojection interpolation positions (Step 220), as a result of which a rectangular linear pattern which is continuous as one linear pattern is reproduced in the processed image memory 32.

In the above-described method, in the case where the original image has no linear pattern at all, or noises are superposed on the original image, noises may be detected from other than lines even if the identifying parameters such as a total average standard deviation $\sigma_{av}$ necessary for processing are determined from the original image data. However, such noises appear individually, being not connected to one another. For instance in detecting a road surface for cracks, the road surface is made uneven because of aggregate (small pebbles) in the asphalt concrete, and the uneven parts are observed dark similarly as in the case of a crack in the road surface. However, the uneven parts are not connected to one another, occurring individually. Hence, such noises can be separated from the linear object by removing the linear segments detected individually.

According to the above-described embodiment, (1) The memory region is divided into a plurality of square regions, and for every square region the projection waveforms are obtained. And the square region is repeatedly rotated through a predetermined angle to obtain projection waveforms in a plurality of directions. These projection waveforms are analyzed to recognize a linear pattern as a rectangular linear segment. Therefore, intricate lines such as cracks can be recognized with high accuracy.

(2) The identifying parameters such as average densities and average standards deviations are determined according to the image data stored in the original image memory. Therefore, even if the image data are fluctuated in density or in background noise, the line recognizing operation is stably carried out at all times.

(3) It is unnecessary to use a standard pattern such as a line detecting matching pattern. That is, since such a standard pattern is not used, the recognition of a linear pattern is not limited by the width, length and direction thereof.

(4) Even if a linear pattern to be recognized is locally changed in width or direction, its projection waveforms can be analyzed without intricate operation, whereby it can be readily recognized as a linear segment.

(5) The slit regions are defined in such a manner as to overlap with the adjacent ones. This will eliminate the difficulty that a line is not completely detected when the image or the slit is rotated.

(6) First, with the image data divided coarsely, the projection waveforms are analyzed, and then an interpolation region to be reprojected is determined according to the positional relationship of the region which has a linear pattern. And only for the region thus determined, the projection waveform analysis is carried out. Hence, the operating time is greatly reduced, and the difficulty can be positively prevented that a line is not completely detected.

(7) In the case of directional image data, correction is made according to the directivity of the image data to determine the line existing direction and the line width. Hence, even when directional background noises are included, or the image (density and contrast) of a linear object differs depending on directions, the line direction and width can be accurately detected. Furthermore, the background noises will not be recognized as linear objects; that is, the line detecting operation is carried out with high stability.

(8) The presence or absence of branch is detected, and only for the region having the branch, the slit dividing operation is carried out, and the reprojection waveforms thereof are analyzed to extract a linear segment. Hence, the branch can be accurately detected with the averaging effect maintained unchanged.

Figure 14:
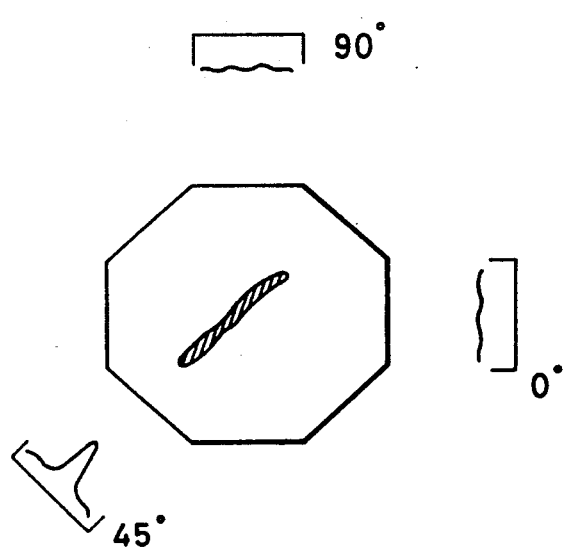
FIG. 14 is an explanatory diagram for a description of one example of a slit.

The invention is not limited to the above-described embodiment; that is, it can be changed or modified. For instance, the method of obtaining projection waveforms in different projection angles may be modified as follows: In the case of an octagonal slit as shown in FIG. 14, the projection waveforms in three directions can be obtained without rotation of the slit or the image. In addition, the number of division and the configuration of the slit are optional. Furthermore, if, after analysis, the centers of the linear segments are extracted and connected with a line, then a linear pattern having no line width can be reproduced.

In the above-described embodiment, for a directional image, the estimated standard deviation $\sigma(\theta)$ is obtained by the linear interpolation that the average standard deviations $\sigma_x$ and $\sigma_y$ are proportionally distributed with respect to angle $\theta$, and the standard deviation $\sigma$ is normalized accroding to the value $\sigma(\theta)$, whereby the image directional in one direction is processed as in the case of an image according to the flying spot method. However, in the case where noises are intricate in directivity as in the case of detecting cracks in a metal surface or tears in a paper or cloth surface in which fibers are extended in a number of directions, instead of the above-described estimated value $\sigma(\theta)$, a non-linear function $f(\theta, \sigma_x, \sigma_y)$ consisting of three variables $\theta, \sigma_x$ and $\sigma_y$ may be used to normalize the standard deviation $\sigma$. The above-described directivity correction by the linear interpolation may be applied not only to the image obtained by the flying spot method, but also to the image provided by an image-pickup element which has noises in one direction as in the case of the image obtained by scanning with a CCD line sensor and to the image of the object whose material itself is directional as in the case of a wood surface or fibers.

INDUSTRIAL APPLICABILITY

The linear pattern recognizing method according to the invention can be effectively applied to recognize not only cracks in road surfaces, but also linear patterns such as cracks, tears, stripes, bends in structures such as asphalt roads, concrete roads, airport runaways, building outer walls, vertical concrete walls, and tunnel inner walls, and of industrial products such as metal plates, plastic plates and vinyl sheets, and linear patterns such as bar-shaped workpieces and introducing while lines which are visual means in robots or in conveying systems.

I claim:

1. A linear pattern recognizing method comprising:

a first step in which the memory region of an original image memory in which image data have been stored is divided into a plurality of overlapping smaller subregions, and according to the image data in said plurality of smaller subregions, projection waveforms at a plurality of different projection angles are obtained for each of said smaller subregions;

a second step of obtaining, according to said projection waveforms obtained in said first step, the line direction of a linear pattern existing in the image data of each of said smaller subregions;

a third step of determining, according to said projection waveforms obtained for said smaller subregions in said first step, whether or not a linear pattern exist in the image data of each of said smaller subregions;

a fourth step of obtaining, according to said projection waveforms obtained for said smaller subregions in said first step, the line width of a linear pattern existing in the image data of each of said smaller subregions;

a fifth step of obtaining, according to said projection waveforms obtained for said smaller subregions in said first step, the line length of a linear of a pattern existing in the image data of each of said smaller subregions;

a sixth step of obtaining, according to said projection waveforms obtained for said smaller subregions in said second through fifth steps, extracting a linear segment corresponding to a linear pattern existing in the image data of each of said smaller subregions; and a seventh step of combining said linear segments in said smaller subregions which have been extracted in said sixth step, to extract said linear pattern included in said image data.

2. A linear pattern recognizing method as claimed in claim 1, in said first step of which an n ×m matrix slit is used to divide said memory region of said original image memory into a plurality of square regions.

3. A linear pattern recognizing method as claimed in claim 1, in said first step of which each projection waveform is obtained with the average value of the densities of a plurality of picture elements existing in a projection direction in each of said smaller regions as a waveform value.

4. A linear pattern recognizing method as claimed in claim 3, in said step second of which, of the projection waveforms obtained in said first step, one which has a projection angle with which a projection waveform is made maximum in peak value is selected, and the projection angle of said projection waveform thus selected is determined as the line direction of said linear pattern.

5. A linear pattern recognizing method as claimed in claim 4, in said third step of which the maximum peak value of said projection waveform in said line direction obtained in said second step is compared with a predetermined threshold value, to determine whether or not a linear pattern exists in said smaller region.

6. A linear pattern recognizing method as claimed in claim 5, in said third step of which said threshold value for determining the presence or absence of a linear pattern is set using the average density of all the image data in said original image memory.

7. A linear pattern recognizing method as claimed in claim 4, in said fourth step of which said projection waveform having the maximum peak value obtained in said second step is cut with a cutting line of a predetermined threshold value, and the distance between the two intersections of said cutting line and said projection waveform is determined as the line width of said linear pattern.

8. A linear pattern recognizingt method as claimed in claim 7, in said fifth step of which, from said image data corresponding to said projection angle providing a maximum peak value which is obtained in said second step, a part is extracted which is between two straight lines which are extended from said two intersections of said cutting line and said projection waveform which are obtained in said fourth step, with respect to said image data thus extracted a projection waveform is obtained in a direction perpendicular to said line direction, and compared with a predetermined threshold value, and the length of the part of said projection waveform which is larger than said threshold value is determined as the line length of said linear pattern.

9. A linear pattern recognizing method as claimed in claim 4, in said fourth step of which said projection waveform having a maximum peak value which is obtained in said second step is processed with a plurality of first threshold values, standard deviation are obtained for a plurality of combination waveforms which are combination of projection waveforms smaller than said first threshold values and straight lines corresponding to said first threshold values and compared with a second threshold value, so that, of said combination waveforms with which said standard deviations are smaller than said second threshold value, one whose first threshold value is largest is selected, and the distance between the two intersections of a straight line corresponding to said first threshold value of said combination waveform and said projection waveform is determined as the line width of said linear pattern.

10. A linear pattern recognizing method as claimed in claim 9, in said fourth step of which a plurality of values which are provided by repeatedly subtracting a predetermined value from the peak value of said projection waveform are employed sa said first threshold values.

11. A linear pattern recognizing method as claimed in claim 4, in said fourth step of which said projection waveform having a maximum peak value which is obtained in said second step is processed with a plurality of first threshold values, average values are obtained for a plurality of combination waveforms which are combination of projection waveforms smaller than said first threshold values and straight lines corresponding to said first threshold values and compared with a second threshold value, so that, of said combination waveforms with which said average values are smaller than said second threshold value, one whose first threshold value is largest is selected, and the distance between the two intersections of a straight line corresponding to said first threshold value of said combination waveform and said projection waveform is determined as the line width of said linear pattern.

12. A linear pattern recognizing method as claimed in claim 11, in said fourth step of which a plurality of values which are provided by repeatedly subtracting a predetermined value from the peak value of said projection waveform are employed as said first threshold values.

13. A linear pattern recognizing method as claimed in claim 1, which said linear segments extracted in said sixth step are rectangular.

14. A linear pattern recognizing method as claimed in claim 1, in which said linear segments extracted in said sixth step are linear.

15. A linear pattern recognizing method comprising:
a first step in which the memory region of an original image memory in which image data have been stored is divided into a plurality of smaller regions, and according to the image data in said plurality of regions, projection waveforms at a plurality of different projection angles and standard deviations for said projection waveforms are obtained for each of said smaller regions;
a second step of obtaining, according to said standard deviations of said projection waveforms obtained in said first step, the line direction of a linear pattern existing in the image data of each of said smaller regions;
a third step of determining, according to said standard deviations of said projection waveforms obtained in said first step, whether or not a linear pattern exists in the image data of each of said smaller regions;
a fourth step of obtaining, according to said projection waveforms obtained for said smaller regions in said first step, the line width of a linear pattern existing in the image data of each of said smaller regions;
a fifth step of obtaining, according to said projection waveforms obtained for said smaller regions in said first step, the line length of a linear pattern existing in the image data of each of said smaller regions; and
a sixth step of extracting, according to the results of operations in said second through fifth steps, extracting a linear segment corresponding to a linear pattern existing in the image data of each of said smaller regions.

16. A linear pattern recognizing method as claimed in claim 15, in said second step of which said plurality of standard deviations at said plurality of projection angles which are obtained in said first step are subjected to comparison, and the projection angle providing the largest said standard deviation is determined as the line direction of said linear pattern.

17. A linear pattern recognizing method as claimed in claim 16, in said third step of which the standard deviation of said projection waveform having maximum in standard deviation which is obtained in said second step is compared with a predetermined threshold value to determine whether or not a linear pattern exists in said smaller region.

18. A linear pattern recognizing method as claimed in claim 17, in said third step of which said threshold value for determining the presence or absence of a linear pattern is set using the average value of said standard deviations of said projection waveforms which are obtained for all the smaller regions in said original image memory.

19. A linear pattern recognizing method as claimed in claim 15, in which said second step comprises:
a first process of obtaining, according to the standard deviations of projection waveforms in two-dimensional directions provided when one of said projection angles obtained in said first step in zero, an average value of standard deviations in two-dimensional directions in said original image memory;
a second process in which said average value of said standard deviations in two-dimensional directions which is obtained in said first process is distributed in proportion to said projection angles;
a third process in which said standard deviations of said projection waveforms at said projection angles which are obtained in said first step are normalized with the values calculated in said second process; and
a fourth process in which said standard deviations at said projection angles which have been normalized in said third process are subjected to comparison, so that, of said projection angles, one which provides a maximum normalization is determined as the line direction of said linear pattern.

20. A linear pattern recognizing method as claimed in claim 19, in said third step of which said normalization obtained in said third process is compared with a predetermined value to determined whether or not a linear pattern exists therein.

21. A linear pattern recognizing method comprising:
a first step in which the memory region of an original image memory in which image data have been stored is divided into a plurality of smaller regions, and according to the image data in said plurality of regions, projection waveforms at a plurality of different projection angles are obtained for each of said smaller regions;
a second step of obtaining, according to said projection waveforms obtained in said first step, the line direction of a linear pattern existing in the image data of each of said smaller regions;
a third step of determining, according to said projection waveforms obtained for said smaller regions in said first step, whether or not a linear pattern exist in the image data of each of said smaller regions;
a fourth step of obtaining, according to said projection waveforms obtained for said smaller regions in said first step, the line width of a linear pattern existing in the image data of each of said smaller regions;
a fifth step of obtaining, according to said projection waveforms obtained for said smaller regions in said first step, the line length of a linear pattern existing in the image data of each of said smaller regions;
a sixth step of extracting, according to the results of operations in said second through fifth steps, extracting a linear segment corresponding to a linear pattern existing in the image data of each of said smaller regions;
a seventh step of determining, according to the result of operation in said third step, the positional relationship of said smaller region having a linear pattern, and determining, according to said positional relationship thus determined, an interpolation position on said original image memory for reprojection;
an eighth step of obtaining projection waveforms at a plurality of different projection angles again at each interpolation position on said original image memory which is determined in said seventh step;
a ninth step of operating, according to said projection waveforms obtained in said eighth step, the presence or absence, line direction, line width and line length of a linear pattern in said interpolation region; and
a tenth step of extracting, according to the results of operation in said ninth step, a linear segment corresponding to a linear pattern which exists in each interpolation region, and combining said linear segment thus extracted with said line segment obtained in said sixth step.

22. A linear pattern recognizing method comprising:
a first step in which the memory region of an original image memory in which image data have been stored is divided into a plurality of smaller regions, and according to the image data in said plurality of regions, projection waveforms at a plurality of different projection angles are obtained for each of said smaller regions;
a second step of obtaining, according to said projection waveforms obtained in said first step, the line direction of a linear pattern existing in the image data of each of said smaller regions;
a third step of determining, according to said projection waveforms obtained for said smaller regions in said first step, whether or not a linear pattern exist in the image data of each of said smaller regions;
a fourth step of obtaining, according to said projection waveforms obtained for said smaller regions in said first step, the line width of a linear pattern existing in the image data of each of said smaller regions;
a fifth step of obtaining, according to said projection waveforms obtained for said smaller regions in said first step, the line length of a linear pattern existing in the image data of each of said smaller regions;
a sixth step of extracting, according to the results of operations in said second through fifth steps, extracting a linear segment corresponding to a linear pattern existing in the image data of each of said smaller regions;
a seventh step of obtaining for each smaller region the standard deviations of said projection waveforms in said line direction obtained in said second step and in a direction perpendicular to said line direction, and determining from said standard deviations whether or not a branch exists in each smaller region;
an eighth step of further dividing each of the smaller regions which are determined to have branches in said seventh step into a plurality of much smaller regions, and obtaining projection waveforms at a plurality of different projection angles again for each of said much smaller regions;
a ninth step of determining, according to said projection waveforms obtained for said much smaller regions in said eight step, the presence or absence, line direction, line width and line length of a linear pattern; and
a tenth step of extracting, according to the results of operation in said ninth step, linear segments corresponding to branches existing in said regions.

23. A linear pattern recognizing method as claimed in claim 22, in said seventh step of which, when the larger of said standard deviations in said two directions is larger in value, and the ratio of said standard deviations in said two directions is substantially equal to one, the existence of a branch in said smaller region is determined.

24. A linear pattern recognizing method as claimed in claim 22, in said eighth step of which each smaller region is divided into said plurality of much smaller overlapping subregions.

* * * * *